United States Patent
Choi et al.

(10) Patent No.: US 9,066,039 B2
(45) Date of Patent: Jun. 23, 2015

(54) SELECTIVE BOOTING METHOD AND BROADCAST RECEIVING APPARATUS USING THE SAME

(75) Inventors: Jin-seok Choi, Yongin-si (KR); Seung-kwon Park, Yongin-si (KR); Hee-soo Lee, Hwaseong-si (KR); Yong-jun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 816 days.

(21) Appl. No.: 12/907,647

(22) Filed: Oct. 19, 2010

(65) Prior Publication Data

US 2011/0141360 A1    Jun. 16, 2011

(30) Foreign Application Priority Data

Dec. 11, 2009    (KR) .................. 10-2009-0123433

(51) Int. Cl.
| | |
|---|---|
| *G06F 15/177* | (2006.01) |
| *G06F 9/00* | (2006.01) |
| *H04N 5/14* | (2006.01) |
| *H04N 5/44* | (2011.01) |
| *G06F 9/44* | (2006.01) |
| *H04N 21/443* | (2011.01) |

(52) U.S. Cl.
CPC .............. *H04N 5/44* (2013.01); *G06F 9/4411* (2013.01); *H04N 21/4432* (2013.01)

(58) Field of Classification Search
CPC ............ G06F 15/177; G06F 9/00; H04N 5/14
USPC .......... 340/12.23, 12.24, 12.25, 12.26, 12.27; 709/219; 725/86; 713/2, 1; 348/571; 345/810, 845; 710/10, 104; 711/151, 711/150, 154
See application file for complete search history.

(56) References Cited

U.S. PATENT DOCUMENTS

| | | | | |
|---|---|---|---|---|
| 6,065,085 | A * | 5/2000 | Odenwald et al. | 710/314 |
| 6,256,714 | B1 * | 7/2001 | Sampsell et al. | 711/154 |
| 6,691,225 | B1 | 2/2004 | Suffin | |
| 6,944,756 | B2 * | 9/2005 | Thomas, III | 713/1 |
| 7,072,950 | B2 * | 7/2006 | Toft | 709/219 |
| 7,146,470 | B2 * | 12/2006 | Heinemann | 711/151 |
| 7,191,261 | B2 * | 3/2007 | Morgan | 710/62 |
| 7,424,623 | B2 * | 9/2008 | Du et al. | 713/300 |

(Continued)

FOREIGN PATENT DOCUMENTS

KR    10-2003-0042045 A    5/2003

OTHER PUBLICATIONS

Communication issued Apr. 5, 2011 by the European Patent Office in counterpart European Patent Application No. 10192438.9.

(Continued)

*Primary Examiner* — Nam V Nguyen
(74) *Attorney, Agent, or Firm* — Sughrue Mion, PLLC

(57) ABSTRACT

A selective booting method and a broadcast receiving apparatus using the same are provided. The broadcast receiving apparatus including: a broadcast reception unit; a display which displays a broadcast received through the broadcast reception unit; a storage unit which stores a plurality of drivers of hardware provided on the broadcast receiving apparatus; and a controller which selectively loads a first driver, among the stored drivers, of first hardware for executing a first operation selected from among a plurality of operations, and then loads a second driver. Therefore, a user may execute foremost a desired operation.

31 Claims, 6 Drawing Sheets

(56) References Cited

U.S. PATENT DOCUMENTS

| | | | |
|---|---|---|---|
| 7,549,041 B2* | 6/2009 | Wang | 713/2 |
| 7,610,331 B1* | 10/2009 | Genske et al. | 709/202 |
| 7,765,280 B2* | 7/2010 | Akins, III | 709/219 |
| 7,840,793 B2* | 11/2010 | Wang | 713/2 |
| 7,886,140 B2* | 2/2011 | Jiang | 713/2 |
| RE43,716 E* | 10/2012 | Wang | 713/2 |
| 8,615,766 B2* | 12/2013 | Gounares | 718/104 |
| 2002/0138592 A1 | 9/2002 | Toft | |
| 2006/0075394 A1* | 4/2006 | Iwamoto | 717/162 |
| 2006/0101259 A1* | 5/2006 | Chen | 713/2 |
| 2009/0106544 A1 | 4/2009 | Sip | |

OTHER PUBLICATIONS

Communication issued Jun. 21, 2012 by the European Patent Office in counterpart European Application No. 10192438.9.

* cited by examiner

SELECTIVE BOOTING METHOD AND BROADCAST RECEIVING APPARATUS USING THE SAME

CROSS-REFERENCE TO RELATED APPLICATIONS

This application claims priority from Korean Patent Application No. 10-2009-0123433, filed on Dec. 11, 2009 in the Korean Intellectual Property Office, the disclosure of which is incorporated herein by reference in its entirety.

BACKGROUND

1. Field

Apparatuses and methods consistent with the exemplary embodiments relate to a selective booting method and a broadcast receiving apparatus using the same, and more particularly, to a selective booting method of a broadcast receiving apparatus executing a plurality of operations and a broadcast receiving apparatus using the same.

2. Description of the Related Art

With the rapid development of multimedia technology, a television (TV) which only receives and displays a broadcast provides various operations besides broadcast display. A TV may be used for various purposes, for example, multimedia, Internet, gaming, home shopping, or the like.

However, although TVs support various operations as described above, TVs are designed to execute the operation of receiving and displaying a broadcast program first after being booted up since their main purpose is to display a broadcast program. As a result, a user has to wait for the state where the TV provides the operation of displaying the broadcast program even when the user intends to operate the TV to use other operations rather than watching the broadcast program.

That is, when a user operates a TV, hardware related to displaying a broadcast program is loaded and then hardware related to other operations is loaded. Therefore, a user cannot use desired operations if hardware related the operations is not booted up.

This TV booting method causes a user to experience an inconvenience, such as time wasting.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

Exemplary embodiments provide a selective booting method in which a user may execute a desired operation promptly and a broadcast receiving apparatus using the same.

Exemplary embodiments also provide a selective booting method which prevents unnecessary time wasting when a user uses a broadcast receiving apparatus having various operations, and a broadcast receiving apparatus implementing the same.

According to an aspect of an exemplary embodiment, there is provided a broadcast receiving apparatus which executes a plurality of operations, the broadcast receiving apparatus including: a broadcast reception unit; a display which displays a broadcast received through the broadcast reception unit; a storage unit which stores drivers of hardware provided on the broadcast receiving apparatus; and a controller which selectively loads a driver of first hardware used to execute a first operation selected from among the plurality of operations, and subsequently loads another driver used to execute a second operation that is not selected from among the plurality of operations.

The selected operation may include an operation which is selected to be executed foremost among the plurality of operations.

The controller may selectively load the driver of the first hardware, load an application used to execute the selected first operation, and subsequently load the other driver.

The plurality of operations may include a broadcast receiving operation and the selected first operation which is different from the broadcast receiving operation.

The controller may selectively load the driver of the first hardware, and subsequently load an unloaded driver of hardware used to execute the broadcast receiving operation.

The controller may control that when other drivers are loaded, marks regarding loading the other driver are invisible on the display.

The selected first operation may be selected by one of a plurality of operation buttons which are provided on a remote controller connected to the broadcast receiving apparatus, and the plurality of operation buttons may be respectively mapped with the plurality of operations.

The controller may control an on-screen display (OSD) through which the first operation to be executed foremost is selected to be displayed.

The controller may control the OSD to be displayed preferentially if the broadcast receiving apparatus is turned on.

The controller may control that if one of the plurality of operations is not selected until a predetermined time elapses after the OSD is displayed, a preset operation is executed foremost.

The controller may control that if the broadcast receiving apparatus is turned on, a driver of hardware used to execute a preset operation among the plurality of operations is loaded first, and another driver is subsequently loaded.

The preset operation may be set by a user.

According to an aspect of another exemplary embodiment, there is provided a booting method including: storing drivers of hardware provided on a broadcast receiving apparatus which performs a plurality of operations; selecting a first operation to be executed first from among the plurality of operations; and selectively loading a driver of first hardware used to execute the selected first operation, and subsequently loading another driver used to execute a second operation which is not selected from among the plurality of operations.

The selected first operation may include an operation which is selected to be executed first among the plurality of operations.

The loading may selectively load a driver of hardware used to execute the selected first operation, load an application used to execute the selected first operation, and subsequently load the other driver.

The plurality of operations may include a broadcast receiving operation and the selected first operation which is different from the broadcast receiving function.

The loading may selectively load the driver of the first hardware, and subsequently load an unloaded driver of hardware used to execute the broadcast receiving operation.

The loading may not display visual marks regarding loading the other driver on the display.

The selected first operation may be selected by one of a plurality of operations buttons which are provided on a remote controller connected to the broadcast receiving apparatus, and the plurality of function buttons may be respectively mapped with the plurality of operations.

The booting method may further include displaying an OSD through which an operation to be executed foremost is selected from among the plurality of operations.

The displaying may display the OSD in response to the broadcast receiving apparatus being turned on.

The loading may execute the broadcast receiving operation foremost if one of the plurality of operations is not selected until a predetermined time elapses after the OSD is displayed.

The loading may first load a driver of hardware used to execute a preset operation among the plurality of operations, and subsequently load another driver if the broadcast receiving apparatus is turned on.

The preset operation may include one of the plurality of operations set by a user.

According to another aspect of another exemplary embodiment, there is provided a broadcast receiving apparatus which executes a plurality of operations, the broadcast receiving apparatus including: a broadcast receiving apparatus which executes a plurality of operations, the broadcast receiving apparatus including: a broadcast reception unit which receives a broadcast; a storage unit which stores a first driver of first hardware provided in the broadcast receiving apparatus for executing a broadcast receiving operation, and a second driver of second hardware provided in the broadcast receiving apparatus for executing a second operation other than the broadcast receiving operation; and a controller which loads the second driver prior to loading the first driver.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
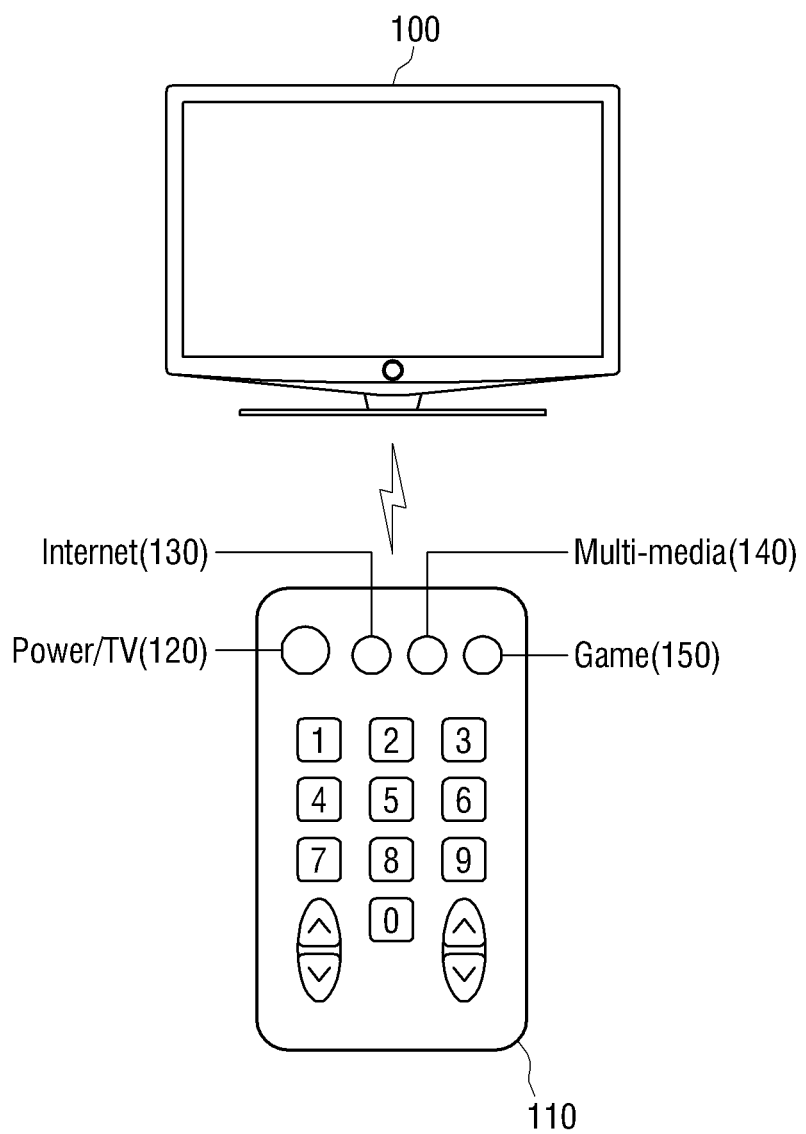
FIG. 1 is a view provided to explain a process of booting up a broadcast receiving apparatus according to an exemplary embodiment.

Certain exemplary embodiments will now be described in greater detail with reference to the accompanying drawings. In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail. Expressions such as "at least one of," when preceding a list of elements, modify the entire list of elements and do not modify the individual elements of the list.

FIG. 1 is a view provided to explain a process of booting up a broadcast receiving apparatus 100 according to an exemplary embodiment. As shown in FIG. 1, the broadcast receiving apparatus 100 receives a signal from a remote controller 110 which is wirelessly connected to the broadcast receiving apparatus 100, and operates in response to the signal.

For example, the broadcast receiving apparatus 100 may be a television (TV) or a digital television (DTV) which performs various operations in addition to receiving a broadcast. However, any device which supports the basic operation of receiving a broadcast and other additional operation may be applied to the exemplary embodiment, even if the device is not a TV.

As an example, the broadcast receiving apparatus 100 provides Internet, gaming, and multimedia operations in addition to the operation of displaying a broadcast. The broadcast receiving apparatus 100 receives a signal from a remote controller 110, and performs the operation corresponding to the received signal. The remote controller 110 includes a plurality of operation buttons, and each button is mapped with each of a plurality of operations of the broadcast receiving apparatus 100.

If a user presses an Internet button 130 of the remote controller 110, the remote controller 110 generates a signal to execute the Internet operation. Then, the broadcast receiving apparatus 100 receives the signal, and loads drivers of hardware used to execute the Internet operation the foremost in order to provide the environment where a user can immediately execute the Internet operation.

The broadcast receiving apparatus 100 loads drivers of hardware which run the other operations of receiving a broadcast, playing a game, and using multimedia while a user uses the Internet operation. Therefore, if a user presses a Game button 150 to terminate the Internet operation and to use the game operation, the broadcast receiving apparatus 100 provides the game operation promptly without delay since the drivers of hardware which supports the game operation have been loaded already. In the same manner, when a user presses a Power/TV button 120 or a Multimedia button 140, the user may also promptly use the operation corresponding to the pressed button.

Figure 2:
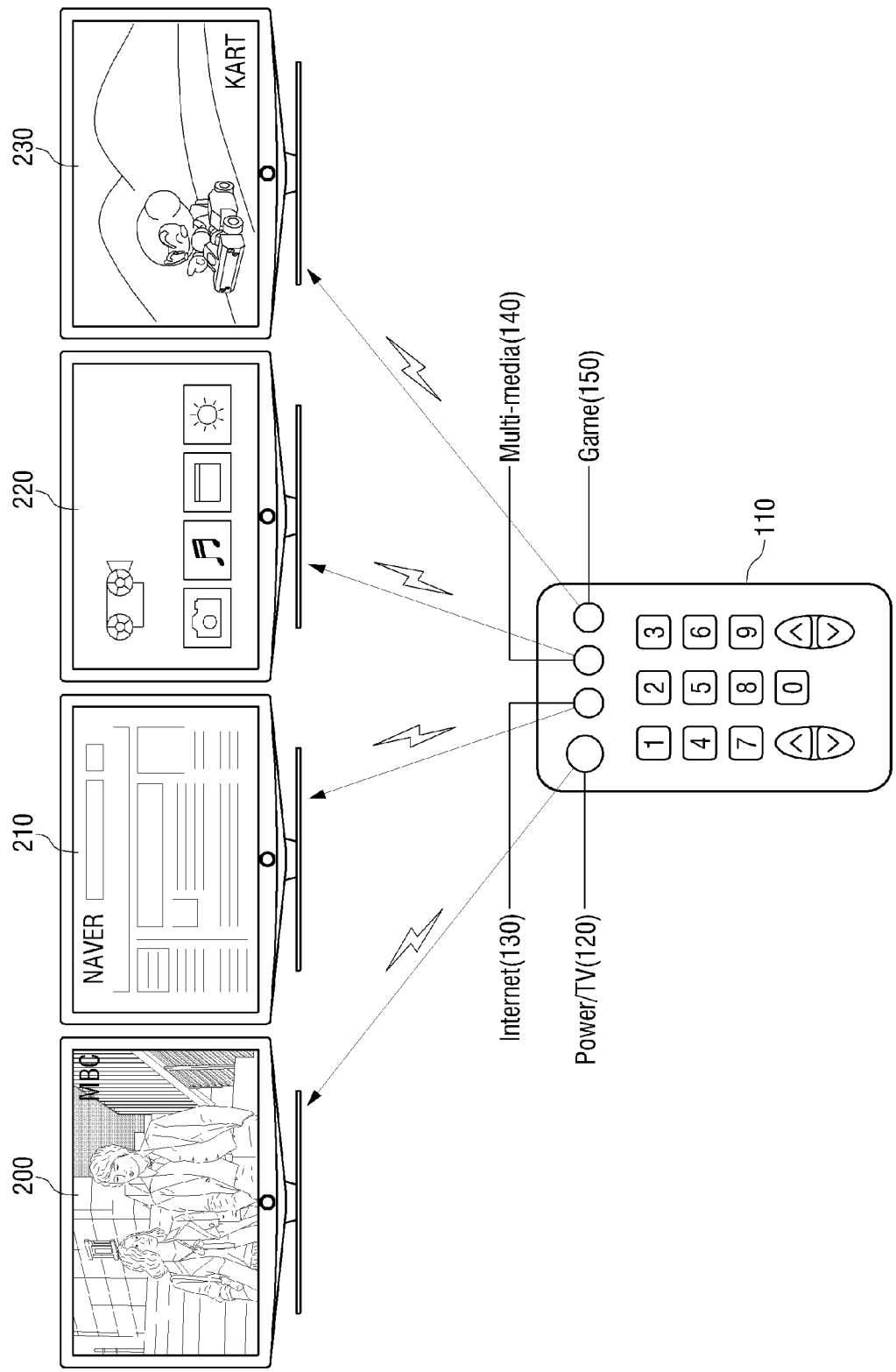
FIG. 2 is a view illustrating in more detail the process of booting up a broadcast receiving apparatus according to an exemplary embodiment.

Hereinbelow, the process of booting up the broadcast receiving apparatus according to an exemplary embodiment will be explained in more detail with reference to FIG. 2. Referring to FIGS. 1 and 2, if a user presses the Internet button 130 on the remote controller 110 while the broadcast receiving apparatus 100 is turned off, the broadcast receiving apparatus 100 loads a driver of hardware for the Internet operation. That is, the broadcast receiving apparatus 100 loads the driver of hardware for displaying or hardware for wireless communication. An application 210 for executing the Internet operation is loaded, and the application 210 is displayed on the broadcast receiving apparatus 100, enabling a user to use the Internet operation promptly.

After the driver of hardware and the application 210 for executing the Internet operation are loaded, the broadcast receiving apparatus 100 loads drivers of hardware for the other operations, such as watching a broadcast program, playing a game, and using multimedia, except for the driver of hardware for the Internet operation. Accordingly, the broadcast receiving apparatus 100 is able to convert into other operations immediately without delay of time when a user terminates using the Internet operation.

The user may use the Internet operation without interference, as the broadcast receiving apparatus 100 does not display any visual indication of the Internet loading progress.

If the user terminates the Internet operation, and presses another button, for example, the Multimedia button 140, the broadcast receiving apparatus 100 immediately converts the current operation into a multimedia screen 220 since the driver of hardware and the application for executing the multimedia have already been loaded, enabling a user to use the multimedia operation promptly. Similarly, if the TV button 120 or the Game button 150 is pressed, the broadcast receiving apparatus 100 immediately converts the current operation into a TV screen 200 or the gaming screen 230, respectively.

Even when the user first presses the Multimedia button 140 or the Game button 150, the drivers of hardware and the applications for each of the multimedia operation and the game operation are loaded first by the above process.

According to the broadcast receiving apparatus 100 described with reference to FIGS. 1 and 2, a user uses the remote controller 110 to select the operation which the user desires to use at first. However, it is understood that another exemplary embodiment is not limited thereto. For example, according to another exemplary embodiment, the user may select the operation using a touch pad (not shown) or input device included in the broadcast receiving apparatus 100.

Figure 3:
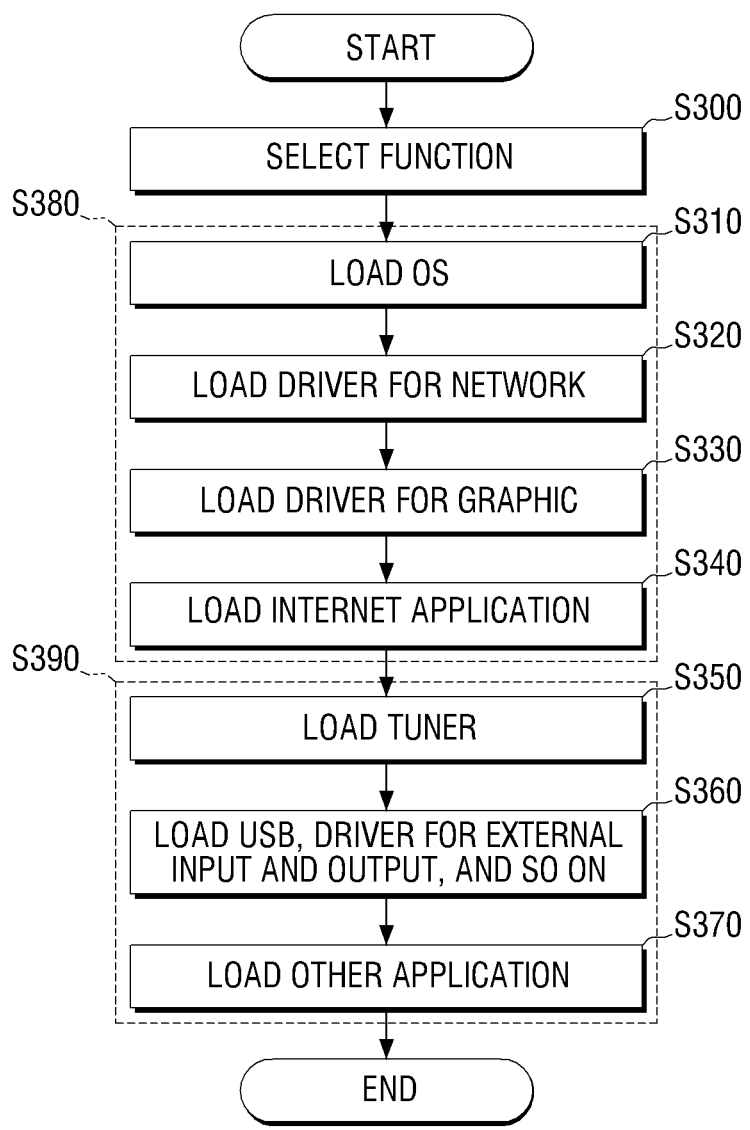
FIG. 3 is a flowchart provided to explain a booting method according to an exemplary embodiment.

FIG. 3 is a flowchart provided to explain a booting method according to an exemplary embodiment. Referring to FIG. 3, a user selects an operation to be performed foremost from among a plurality of operation supported by the broadcast receiving apparatus (S300). The operation may be selected through a remote controller 110 or a touch pad. In this exemplary embodiment, a user selects the Internet operation for more detailed and accurate description, though it is understood that another exemplary embodiment is not limited thereto.

After selecting the operation, the broadcast receiving apparatus 100 loads an operating system (OS) (S310). The OS is loaded to provide the operations except for drivers or applications used to execute other hardware.

Next, the broadcast receiving apparatus 100 loads the driver for network hardware to execute the Internet operation and the driver for graphic hardware (S310, S320). Herein, the order of loading drivers is irrelevant, and the hardware used to execute the Internet operation is limited to the network hardware and the graphic hardware. However, other exemplary embodiments are not limited thereto.

The Internet application is loaded (S330), and thus a user may use the Internet through the broadcast receiving apparatus 100.

Other drivers and applications which have not been loaded yet are loaded while the user uses the Internet operation. A tuner which is a basic hardware device of the broadcast receiving apparatus is loaded (S350), and then a universal serial bus (USB) or an external input and output driver is loaded (S360). Next, the other applications which have not been loaded yet are loaded (S370).

If the operation of loading the Internet application is completed (S380), a user may use the Internet. The user may not be interfered while using the Internet since the loading operation 5390 is performed on a background behind the current screen.

By doing so, a user may use the Internet operation which is selected first without a delay of time, and may convert into another operation without a delay of time since drivers of hardware and applications for executing the other operation are loaded.

The method for booting up a broadcast receiving apparatus 100 for executing the Internet operation at first has been explained with reference to FIG. 3. Alternatively, the broadcast receiving apparatus may be booted up in the same manner when a user first selects another operation, such as a multimedia operation or a game operation.

That is, if a user selects a multimedia operation, an operating system (OS) is loaded at first, and then drivers of graphic hardware and sound hardware for executing the multimedia operation are loaded. Meanwhile, drivers and applications for the other operations are loaded and, thus, booting is completed while the user uses the multimedia operation through the broadcast receiving apparatus 100.

Similarly, for the gaming operation, after an operating system is loaded, drivers of hardware for executing the gaming operation are loaded first, and then unloaded drivers and applications are loaded and the broadcast receiving apparatus 100 is completely booted up while a user uses the gaming operation through the broadcast receiving apparatus 100.

Figure 4:
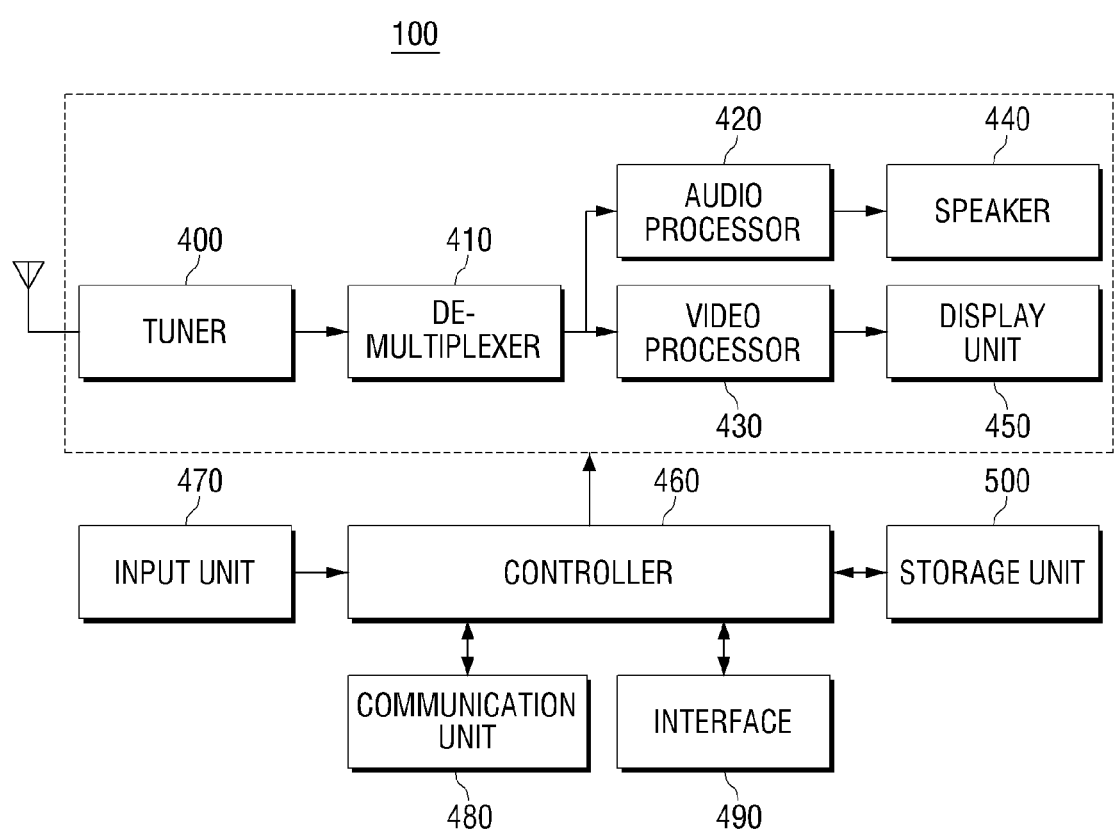
FIG. 4 is a block diagram illustrating a broadcast receiving apparatus according to an exemplary embodiment.

FIG. 4 is a block diagram illustrating a broadcast receiving apparatus 100 according to an exemplary embodiment. Referring to FIG. 4, the broadcast receiving apparatus 100 includes a tuner 400, a de-multiplexer 410, an audio processor 420, a video processor 430, a speaker 440, a display unit 450, a controller 460, an input unit 470, a communication unit 480, an interface 490, and a storage unit 500.

The broadcast receiving apparatus 100 supports the operation of receiving a broadcast via an antenna and displaying the received broadcast, and also supports various operations such as Internet, multimedia, gaming, or the like. As an example, the broadcast receiving apparatus 100 may be a digital TV, a Hub-TV, or a settop box.

The tuner 400 tunes to a channel of a broadcast which is received through air or a cable over a wired or wireless communication link. More specifically, the broadcast receiving apparatus 100 sets one of a plurality of channels to be an input channel, receives a broadcast signal of the input channel from an antenna, and provides the de-multiplexer 410 with the broadcast signal.

The de-multiplexer 410 separates the broadcast signal output from the tuner 400 into a video signal and an audio signal, and outputs the separated signals. The audio signal and the video signal separated from the broadcast signal are input to the audio processor 420 and the video processor 430, respectively, and used to display the broadcast signal.

The audio processor 420 decodes the audio signal separated by the de-multiplexer 410, converts the audio signal into a format which is capable of being output through the speaker 440, and provides the speaker with the converted audio signal. The video processor 430 decodes the video signal separated by the de-multiplexer 410, converts the video signal into a format which is capable of being output through the display unit 450, and provides the display unit 450 with the converted video signal.

The speaker 440 and the display unit 450 output the input audio signal and the input video signal, respectively. Herein, the speaker 440 may be an external device which is connected through the interface 490.

The input unit 470 provides an input command which is generated by a user manipulation to the controller 460. In the present exemplary embodiment, the signal input to the input unit 470 may be a signal which is input through a remote controller connected to the broadcast receiving apparatus 100 or through a touch pad or input device included in the broadcast receiving apparatus 100. The remote controller includes operation buttons which are mapped with a plurality of operations supported by the broadcast receiving apparatus 100, respectively.

The controller 460 controls overall operations of the tuner 400, the de-multiplexer 410, the audio processor 420, and the video processor 430, to correspond to the input signal which is received from the input unit 470. Furthermore, the controller 460 may control the communication unit 480 in an environment where wireless communication is possible, or may control the interface 490 in an environment where the broadcast receiving apparatus 100 is capable of communicating with other external devices.

The communication unit 480 provides an environment where the broadcast receiving apparatus 100 is capable of communicating with an external device, and the interface 490 enables interface with an external device.

The storage unit 500 stores drivers used to execute various hardware. The controller 460 reads and loads the drivers stored in the storage unit 500. However, drivers for driving hardware may be stored in an external storage medium in another exemplary embodiment. In this case, the controller 460 reads and loads drivers from the external storage medium connected through the interface 490 or the communication unit 480.

Figure 5A:
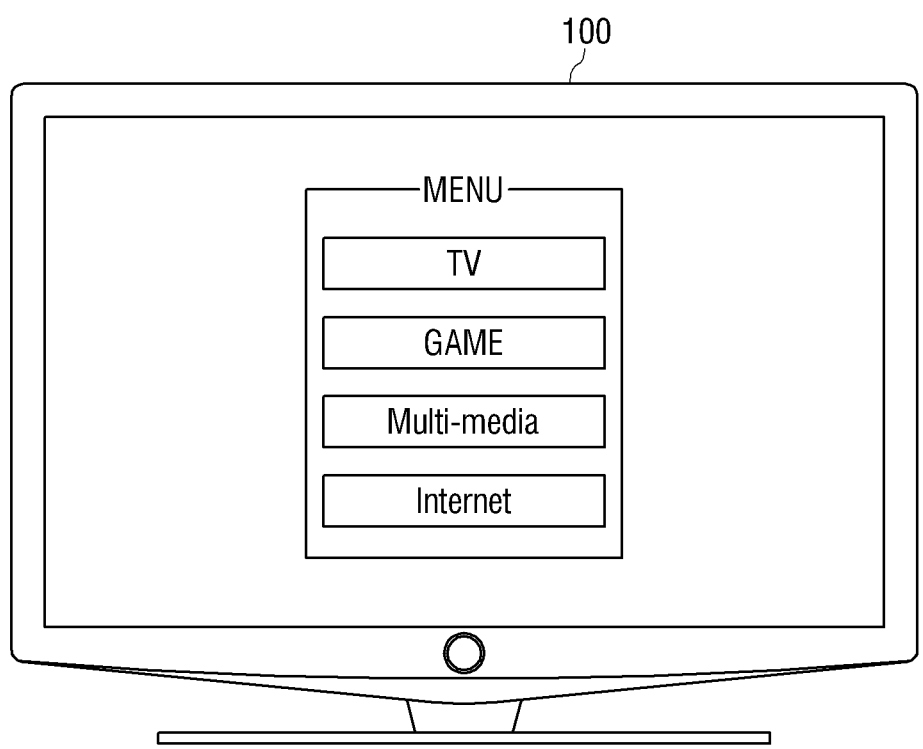
FIGS. 5A and 5B are views illustrating the structure of an on-screen display (OSD) according to an exemplary embodiment.
Figure 5B:
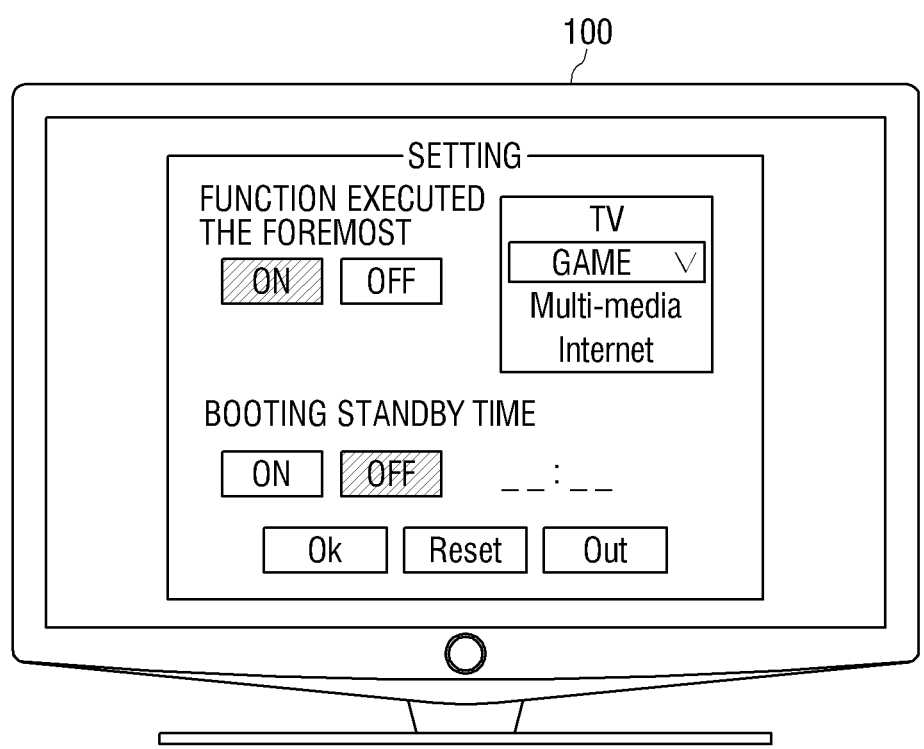

FIGS. 5A and 5B are views illustrating a structure of an on-screen display (OSD) according to an exemplary embodiment. FIG. 5A illustrates a structure of an OSD which is related to a menu for selecting an operation to be executed first from among a plurality of operations.

Referring to FIG. 5A, a user may select the operation which the user desires to execute foremost using a remote controller, and the broadcast receiving apparatus 100 displays an OSD so that a user may easily select a desired operation. The structure of the OSD illustrated in FIG. 5A is merely exemplary, and the OSD having other menus may be implemented according to other exemplary embodiments. The OSD menu may be added or deleted.

If the broadcast receiving apparatus 100 is turned on, the OSD may be displayed initially. Therefore, the broadcast receiving apparatus 100 provides an environment where a user may select the operation to be executed first through an OSD when the broadcast receiving apparatus 100 is turned on, enabling the user to easily select a desired operation. Whether to initially display an OSD may be set by a user and stored in the storage unit 500.

FIG. 5B illustrates an OSD through which a user sets the operation to be executed foremost and the booting standby time in advance in the broadcast receiving apparatus 100. The user may set and store the operation to be executed foremost. In this case, if the broadcast receiving apparatus 100 is turned on, the broadcast receiving apparatus regards a predetermined operation as a selected operation, and executes the predetermined operation foremost. The method for executing a predetermined operation foremost has been described above.

If a user does not select any operation until a predetermined time (booting standby time) elapses while an OSD is displayed, the broadcast receiving apparatus 100 may execute the operation of receiving a broadcast after a predetermined time elapses. Herein, a user may also set a booting standby time, and store the time in the broadcast receiving apparatus 100. Alternatively, not only is it possible to execute the broadcast receiving operation after the booting standby time elapses, but it is also possible to initially execute a different operation in another exemplary embodiment, if the different operation has been preset.

It is understood that the OSD illustrated in FIG. 5B is merely exemplary, and it is apparent for those skilled in the art to implement the OSD using other manners in other exemplary embodiments.

As described above, according to the selective booting method and the broadcast receiving apparatus using the same, a user may use a desired operation promptly in addition to the operation of watching a broadcast program, and thus unnecessary time waste may be prevented.

While not restricted thereto, the exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, the exemplary embodiments may be written as computer programs transmitted over a computer-readable transmission medium, such as a carrier wave, and received and implemented in general-use digital computers that execute the programs. Moreover, while not required in all aspects, one or more units of the broadcast receiving apparatus 100 can include a processor or microprocessor executing a computer program stored in a computer-readable medium, such as the storage unit 500.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A broadcast receiving apparatus which executes a plurality of operations, the broadcast receiving apparatus comprising:
   a broadcast reception unit which receives a broadcast;
   a display unit which displays the received broadcast;
   a storage unit which stores a plurality of drivers of hardware provided in the broadcast receiving apparatus; and
   a controller which selectively loads a first driver, among the stored drivers, of first hardware for executing a first operation selected from among the plurality of operations, and subsequently loads a second driver, among the stored drivers, of second hardware for executing a second operation that is not selected from among the plurality of operations,
   wherein the controller selectively loads the first driver of the first hardware, loads an application for executing the selected first operation, and subsequently loads the second driver while the selected first operation is executing, and
   wherein, in response to a user command, the controller terminates the first operation and executes the second operation without delay in time for booting-up the second operation.

2. The broadcast receiving apparatus as claimed in claim 1, wherein the first operation comprises an operation which is selected to be executed foremost among the plurality of operations.

3. The broadcast receiving apparatus as claimed in claim 1, wherein the plurality of operations comprises a broadcast receiving operation and the selected operation, which is different from the broadcast receiving operation.

4. The broadcast receiving apparatus as claimed in claim 3, wherein the second driver of the second hardware is for executing the broadcast receiving operation.

5. The broadcast receiving apparatus as claimed in claim 1, wherein, when drivers other than the first driver are loaded, the controller controls the display unit to not display any marks regarding loading the other drivers.

6. The broadcast receiving apparatus as claimed in claim 1, wherein the selected first operation is selected by one of a plurality of operation buttons which are provided on a remote controller connected to the broadcast receiving apparatus, and the plurality of operation buttons are respectively mapped with the plurality of operations.

7. The broadcast receiving apparatus as claimed in claim 1, wherein the controller controls the display unit to display an on-screen display (OSD) through which the first operation to be executed foremost is selected.

8. The broadcast receiving apparatus as claimed in claim 7, wherein the controller controls the display unit to display the OSD in response to the broadcast receiving apparatus being turned on.

9. The broadcast receiving apparatus as claimed in claim 7, wherein the controller controls the broadcast receiving apparatus to execute a preset operation of the plurality of operations foremost if one of the plurality of operations is not selected until a predetermined time elapses after the OSD is displayed on the display unit.

10. The broadcast receiving apparatus as claimed in claim 1, wherein the controller controls the broadcast receiving apparatus, in response to the broadcast receiving apparatus being turned on, to first load the first driver of the first hardware, and to subsequently load the second driver.

11. The broadcast receiving apparatus as claimed in claim 10, wherein the first operation is a preset operation among the plurality of operations to be executed first in response to the broadcast receiving apparatus being turned on.

12. The broadcast receiving apparatus as claimed in claim 11, wherein the preset operation is set by a user.

13. The broadcast receiving apparatus as claimed in claim 1, wherein the controller controls the broadcast receiving apparatus, in response to the broadcast receiving apparatus being turned on by a user selection of the first operation, to first load the first driver, and to subsequently load the second driver.

14. The broadcast receiving apparatus as claimed in claim 1, wherein the first driver and the second driver are concurrently present in the storage unit.

15. The broadcast receiving apparatus as claimed in claim 1, wherein the controller loads a third driver while the selected second operation is executing.

16. The broadcast receiving apparatus as claimed in claim 15, wherein the first driver and the third driver are concurrently present in the storage unit.

17. A booting method of a broadcast receiving apparatus which executes a plurality of operations and which has stored therein drivers of hardware provided in the broadcast receiving apparatus, the booting method comprising:
selecting a first operation to be executed first from among the plurality of operations;
selectively loading a first driver, among the stored drivers, of first hardware for executing the selected first operation, and subsequently loading a second driver of second hardware for executing a second operation that is not selected from among the plurality of operations,
wherein the loading the driver comprises selectively loading the first driver of the first hardware, loading an application for executing the selected first operation, and subsequently loading the second driver while the selected first operation is executing; and
in response to a user command, terminating the first operation and executing the second operation without delay in time for booting-up the second operation.

18. The booting method as claimed in claim 17, wherein the selected first operation comprises an operation which is selected to be executed first among the plurality of operations.

19. The booting method as claimed in claim 17, wherein the plurality of operations comprises a broadcast receiving operation and the selected operation, which is different from the broadcast receiving operation.

20. The booting method as claimed in claim 19, wherein the second driver of the second hardware is for executing the broadcast receiving operation.

21. The booting method as claimed in claim 17, wherein the loading the first driver does not display visual marks regarding loading the second driver on a display unit.

22. The booting method as claimed in claim 17, wherein:
the selecting the first operation comprises selecting the first operation by manipulation of one of a plurality of operation buttons which are provided on a remote controller connected to the broadcast receiving apparatus, and
the plurality of operations buttons are respectively mapped with the plurality of operations.

23. The booting method as claimed in claim 17, further comprising:
displaying an on-screen display (OSD) through which the first operation to be executed foremost is selected from among the plurality of operations.

24. The booting method as claimed in claim 23, wherein the displaying comprises displaying the OSD in response to the broadcast receiving apparatus being turned on.

25. The booting method as claimed in claim 23, wherein the selecting the first operation comprises selecting the first operation, which is a preset operation, if one of the plurality of operations is not selected until a predetermined time elapses after the OSD is displayed.

26. The booting method as claimed in claim 17, wherein the loading the first driver comprises, in response to the broadcast receiving apparatus being turned on, first loading the first driver of the first hardware for executing the first operation, which is a preset operation, and subsequently loading the second driver.

27. The booting method as claimed in claim 26, wherein the preset operation is set by a user.

28. A computer readable recording medium having recorded thereon a program executable by a computer for performing the method of claim 17.

29. A broadcast receiving apparatus which executes a plurality of operations, the broadcast receiving apparatus comprising:
a broadcast reception unit which receives a broadcast;
a storage unit which stores a first driver of first hardware provided in the broadcast receiving apparatus for executing a broadcast receiving operation, and a second driver of second hardware provided in the broadcast receiving apparatus for executing a second operation other than the broadcast receiving operation; and
a controller which loads the second driver prior to loading the first driver in response to a turning on of the broadcast receiving apparatus,
wherein the controller selectively loads the first driver of the first hardware, loads an application for executing the selected first operation, and subsequently loads the second driver while the selected first operation is executing, and
wherein, in response to a user command, the controller terminates the first operation and executes the second operation without delay in time for booting-up the second operation.

30. The broadcast receiving apparatus as claimed in claim 29, wherein the controller controls the broadcast receiving apparatus to execute the second operation without delay caused by loading of the first driver.

31. The broadcast receiving apparatus as claimed in claim 29, wherein the second operation is at least one of an Internet operation, a gaming operation, and a multimedia operation.

\* \* \* \* \*